United States Patent
Zhou (10) Patent No.: US 9,020,835 B2
(45) Date of Patent: Apr. 28, 2015

(54) SEARCH-POWERED CONNECTION TARGETING

(75) Inventor: Ding Zhou, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 156 days.

(21) Appl. No.: 13/549,061

(22) Filed: Jul. 13, 2012

(65) Prior Publication Data

US 2014/0019240 A1 Jan. 16, 2014

(51) Int. Cl.
*G06Q 30/02* (2012.01)

(52) U.S. Cl.
CPC .................................. *G06Q 30/0203* (2013.01)

(58) Field of Classification Search
CPC .......... G06Q 30/0251; G06Q 30/0255; G06Q 30/0269
USPC .................................. 705/14.49, 14.53, 14.66
See application file for complete search history.

(56) References Cited

U.S. PATENT DOCUMENTS

| | | | |
|---|---|---|---|
| 7,739,211 B2 * | 6/2010 | Coffman et al. ................ | 706/45 |
| 7,996,336 B2 * | 8/2011 | Parida et al. ...................... | 706/2 |
| 8,185,558 B1 | 5/2012 | Narayanan et al. | |
| 8,239,364 B2 * | 8/2012 | Wable et al. .................. | 707/706 |
| 8,538,960 B2 * | 9/2013 | Wong et al. ................... | 707/732 |
| 2005/0228797 A1 | 10/2005 | Konigstein et al. | |
| 2006/0143081 A1 * | 6/2006 | Argaiz ............................ | 705/14 |
| 2006/0242013 A1 | 10/2006 | Agarwal et al. | |
| 2007/0121843 A1 * | 5/2007 | Atazky et al. ............ | 379/114.13 |
| 2007/0191040 A1 * | 8/2007 | Kadar et al. .................. | 455/466 |
| 2007/0226248 A1 * | 9/2007 | Darr .............................. | 707/102 |
| 2008/0256059 A1 * | 10/2008 | Chang et al. ....................... | 707/5 |
| 2008/0275899 A1 * | 11/2008 | Baluja et al. .................. | 707/102 |
| 2008/0288491 A1 * | 11/2008 | Wu et al. ............................ | 707/7 |
| 2008/0294607 A1 | 11/2008 | Partovi et al. | |
| 2009/0030932 A1 * | 1/2009 | Harik et al. ................... | 707/102 |
| 2009/0157644 A1 * | 6/2009 | Gollapudi et al. ................ | 707/5 |
| 2009/0228296 A1 * | 9/2009 | Ismalon ............................ | 705/1 |

(Continued)

FOREIGN PATENT DOCUMENTS

KR 10-2010-0001148 1/2010

OTHER PUBLICATIONS

Park et al.; System for searching advertisement keyword and method for providing recommended advertisement keyword; KR20100001148(A)—Jan. 6, 2010; translated to English by USPTO Feb. 2014.*

(Continued)

*Primary Examiner* — John G Weiss
*Assistant Examiner* — Adam Chornesky
(74) *Attorney, Agent, or Firm* — Fewick & West LLP (57) ABSTRACT

A social networking system extends the reach of an ad by allowing an advertiser to seed a search for suggesting targeting criteria for an ad. Using the seeds, the social networking system identifies a set of seed objects from a social graph. The social networking system traverses the social graph to compute the similarity between the seed objects and candidate objects related to the seed objects. Based on the computed similarity, the social networking system suggests a set of target objects to the advertiser. The social networking system receives a selection of one or more target objects from the advertiser. From the selected target objects the social networking system determines one or more targeting criteria for the ad, so users with an edge in the social graph to any of the selected target objects are eligible to receive the ad.

26 Claims, 4 Drawing Sheets

(56) References Cited

U.S. PATENT DOCUMENTS

| | | | |
|---|---|---|---|
| 2009/0281988 A1* | 11/2009 | Yoo ................................. | 707/3 |
| 2010/0145777 A1* | 6/2010 | Ghosh et al. ................. | 705/14.1 |
| 2010/0205057 A1* | 8/2010 | Hook et al. ................. | 705/14.52 |
| 2010/0228631 A1* | 9/2010 | Zhang et al. ................. | 705/14.66 |
| 2010/0257023 A1 | 10/2010 | Kendall et al. | |
| 2010/0268830 A1* | 10/2010 | McKee et al. ................. | 709/228 |
| 2010/0274815 A1* | 10/2010 | Vanasco ........................ | 707/798 |
| 2011/0087534 A1* | 4/2011 | Strebinger et al. ......... | 705/14.25 |
| 2011/0137932 A1 | 6/2011 | Wable | |
| 2011/0191417 A1* | 8/2011 | Rathod ........................ | 709/204 |
| 2011/0202406 A1* | 8/2011 | Suomela ..................... | 705/14.52 |
| 2011/0264522 A1* | 10/2011 | Chan et al. ................. | 705/14.52 |
| 2012/0001919 A1 | 1/2012 | Lumer | |
| 2012/0209677 A1* | 8/2012 | Mehta et al. ................. | 705/14.16 |
| 2012/0233000 A1* | 9/2012 | Fisher et al. ............... | 705/14.71 |
| 2013/0073400 A1* | 3/2013 | Heath ........................ | 705/14.73 |
| 2013/0073473 A1* | 3/2013 | Heath ......................... | 705/319 |
| 2013/0086057 A1* | 4/2013 | Harrington et al. ............ | 707/732 |
| 2013/0110835 A1* | 5/2013 | He ................................. | 707/737 |
| 2013/0124437 A1* | 5/2013 | Pennacchiotti et al. ........ | 706/12 |
| 2013/0151332 A1* | 6/2013 | Yan et al. .................... | 705/14.42 |
| 2013/0173485 A1* | 7/2013 | Ruiz et al. ..................... | 705/319 |
| 2013/0254213 A1* | 9/2013 | Cheng et al. .................. | 707/748 |
| 2013/0254303 A1* | 9/2013 | Cheng et al. .................. | 709/206 |
| 2013/0297689 A1* | 11/2013 | Bhat et al. ..................... | 709/204 |

OTHER PUBLICATIONS

Donian et al. (WO 2004/003879 A2) method and apparatus for the free licensing of digital media content.*

Huber et al.; "Friend-in-the-middle Attacks: Exploiting Social Networking Sites for Spam"; Jan. 13, 2011; 1089-7801/11/$26.00 © 2011 IEEE.*

European Patent Office, European Search Report and Opinion, European Patent Application No. 13174511.9, Nov. 22, 2013, six pages.

PCT International Search Report and Written Opinion, PCT Application No. PCT/US2013/048933, Oct. 16, 2013, ten pages.

* cited by examiner

SEARCH-POWERED CONNECTION TARGETING

BACKGROUND

This disclosure relates generally to social networking, and in particular to creating targeting criteria for advertisements using a search for objects in a social graph to define the targeting criteria.

Advertisers use social networking systems to deliver targeted advertisements ("ads") to users of the social networking system. In many cases, the extent to which an ad reaches a target group of users depends on the targeting criteria used to identify the target group. For example, to serve an ad promoting a newly released single for a new jazz vocalist from Portland, Oreg., advertisers may specify the following targeting criteria—male and females ages 26-30, interest in jazz, interest in the new jazz vocalist, and hometown somewhere in the Pacific Northwest.

Applying these targeting criteria, the social networking system identifies a set of users, and serves the ad. Specifying and applying targeting criteria in this manner, however, limits the reach of an ad by only specifying user characteristic. Without leveraging other information logged by the social networking system to target ads, social networking systems limit the ability of advertisers to extend the reach of ads to a larger group of users.

SUMMARY

To enable advertisers to extend the reach of an advertisement ("ad"), a social networking system allows an advertiser to seed a search of the social networking system to obtain targeting criteria for the ad. The targeting criteria may specify one or more characteristics in the social networking system identifying users to whom the advertiser seeks to serve the ad. In one embodiment, a seed comprises one or more keywords associated with the desired targeting group by the advertiser. The social networking system queries a social graph it maintains to identify a set of seed objects associated with the seed. The social graph comprises nodes representing users or other objects in the social networking system, with edges connecting nodes to represent interactions and/or relationships between the objects in the social networking system. Hence, the seed objects may be pages associated with the seed, events associated with the seed, groups associated with the seed, status updates by users associated with the seed, or any other object in the social networking system associated with the seed.

Based on the seed objects, the social networking system identifies additional candidate objects that are related to the seed objects. In one embodiment, the social networking system traverses the social graph to identify candidate objects based on the similarity between objects and a seed object. In one embodiment, a similarity between a seed object and an object is determined based on a number of nodes in the social graph connected to both a node associated with the seed object and to a node associated with the object.

The social networking system presents a set of the candidate objects to the advertiser based on the similarity. For example, candidate objects having at least a threshold similarity to the seed object are presented to the advertiser. The social networking system receives one or more target objects selected from the set of candidate objects by the advertiser and determines one or more targeting criteria for the ad based on the one or more target objects so that users with an edge to any of the target objects are eligible to receive the ad.

In an embodiment, to further extend the reach of an ad, the social networking system iteratively searches the social graph for additional candidate objects responsive to received target object selections from the advertiser. The social networking system traverses the social graph to identify additional candidate objects based on similarity between the target objects and objects in the social graph. The social networking system presents a set of the additional candidate objects to the advertiser, allowing one or more of the additional candidate objects to be selected as additional target objects.

In some cases, this process described above repeats, generating additional candidate objects based on the selection of target objects by the advertiser, until the social networking system receives an indication from the advertiser that selection of target objects is complete. Responsive to receiving the selection completion indication, the social networking system determines targeting criteria for the ad based on the target objects selected by the advertiser. Users with an edge to at least one of the selected target objects are eligible to receive the ad.

The Figures depict various embodiments for purposes of illustration only. One skilled in the art will readily recognize from the following discussion that alternative embodiments of the structures and methods illustrated herein may be employed without departing from the principles of this disclosure.

DETAILED DESCRIPTION

Overview

A social networking system offers its users the ability to connect and interact with other users and objects of the social networking system. Through these connections and interaction, users in turn, gain access to information and services relevant to them based on information the user elects to share with the social networking system. For example, information and content shared by users helps the social networking system connect users interested in particular goods or services with merchants offering those goods or services. As users become more socially connected, the social networking system discovers and presents other connections to users based on the information and content shared by the users. Using these insights unique to the social networking system, users receive information about goods, services, events, causes, or other interests relevant to them that they might not have otherwise discovered.

Users of a social networking system may be an individual or any other entity, such as a business or other non-person entity. A social networking system object may be a social networking system user or a non-person object. Examples of non-person objects includes a content item (e.g., image, video, photo, or shared link), a group (e.g., users with similar interests), a social networking system page, an event, a message (e.g., status update, post, news feed item, chat, text, or e-mail), a concept, or any other suitable data. Other social networking system objects include, for example, a photo album, an application, a check-in to a location, a comment, a friend list, a shared link, an order, a question, a user profile, or the like.

Users join the social networking system and add connections to other users to whom they desire to be connected. Users provide information describing them, such as name, age, gender, education history, employment history, hometown, relationship status, and interests. The social networking system, in turn, stores this information in a user profile associated with the respective user.

Using information stored in user profiles combined with other information about user interactions internal to and external to the social networking system, the social networking system provides information and services relevant to its user. For example, the social networking system may target ads to a user based on interests expressed by the user, connections the user shares with another social networking system object, or more generally, similarity between the user and another social networking system object. This allows the social networking system to provide the user with advertisements more likely to be of interest to the user.

To better organize and access information about objects and relationships between objects, also referred to as "social information," social networking systems may maintain a social graph. In various embodiments, the social graph comprises a plurality of nodes, with nodes connected by one or more edges. Various objects in the social networking system may be associated with nodes, and the edges connecting nodes may identify the relationship or interactions between objects corresponding to the connected nodes. Hence, the social graph describes the interaction and/or relationship between objects in the social networking system.

In operation, when a first user connects with a second user in the social networking system, the users are each represented by nodes, and the connection represented by one or more edges connecting the nodes. Actions taken by the users are then represented by additional edges between the nodes. For example, an edge between the nodes represents the first user sending a message to the second user and another edge represents the first user tagging the second user in a picture stored by the social networking system. Additionally, a message or picture associated with the first or second user may be represented by another that is connected by one or more edges to nodes representing the first or second user.

In an embodiment, the social graph also includes custom graph object types and graph action types. Custom graph object types and graph action types may be defined by third-party developers or social networking system administrators. For example, a custom graph object for a music album may have several defined object properties specific to the music album, such as a title, artist, producers, year, and the like. In turn, a graph action type describing interactions with the music album object may include "purchase" or "listen." These graph action types may be used by a third-party developer on a website external to the social networking system to report actions performed by users of the social networking system on custom graph objects external to the social networking system. A social graph including actions and objects external to the social networking system may be referred to as an "open" social graph. Such an "open" social graph allows custom graph objects and actions on external websites to be created and captured.

For example, an open social graph allows users of the social networking system to express interest in web pages hosted on websites external to the social networking system. These web pages are represented as custom graph objects in the social networking system, with a corresponding node in the social graph. In various embodiments, embedding a widget, a social plug-in, programmable logic or code snippet into external web pages creates the corresponding custom graph objects. For example, an inline Frame (iFrame) is embedded into a web page to create a custom graph object for the web page. Enabling third-party developers to define custom object types and custom action types is described further in "Structured Objects and Actions on a Social Networking System," U.S. application Ser. No. 13/239,340 filed on Sep. 21, 2011, which is hereby incorporated by reference in its entirety. Hence, any information that can be embodied in a web page may become a node in the social graph on the social networking system.

Additionally, social networking systems provide mechanisms for users to interact with other users and objects internal to and external to the social networking system. In an embodiment, the social networking system uses a web-based interface comprising a series of inter-connected pages to allow user access to and interaction with social networking system objects and information. For example, a social networking system may display a page for each social networking system user. The page may include objects and information entered by or related to the social networking system user (e.g., the user's "profile").

A social networking system user interface may be accessible from a web browser or a non-web browser application, such as a dedicated social networking system mobile device, or computer, application. Accordingly, as used herein, "page" may be a web page, an application interface or display, a widget displayed over a web page or application, a box or other graphical interface, an overlay window on another page (whether inside or outside the context of a social networking system), or a web page external to the social networking system with a social networking system plug in or integration capabilities.

Pages may include content such as pictures or videos, and communications or social networking system activity to, from, or by other users. Pages also include links to other social networking system pages, and in some cases, additional capabilities, such as search, real-time communication, content-item uploading, purchasing, advertising, and any other web-based technology or ability. More generally, pages may be associated with concepts, or groups.

The social networking system may use a web-based interface, or another suitable interface, to allow an advertiser to determine targeting criteria for an advertisement ("ad"). For example, the advertiser provides one or more seeds to the social networking system, which accesses the social graph to identify candidate objects associated with one or more seeds. The candidate objects are presented to the advertiser by the interface, allowing the advertiser to use the candidate objects to select target objects used to define targeting criteria. In one embodiment, the interface is modified to present additional candidate objects responsive to the advertiser selecting a target object. In one embodiment, the targeting criteria are specified responsive to the social networking system receiving an indication from the advertiser that the target object selection is complete.

Because of the structure of the social graph, the social networking system may readily analyze the relationship between objects in the social networking system based on their corresponding nodes in the social networking system. In an embodiment, the social networking system determines the similarity between nodes in the social networking system corresponding to objects to identify objects related to an object corresponding to a seed received from an advertiser. Similarity may be determined by any number of methods, including degree of proximity, the similarity of the neighbors associated with the compared nodes or any other suitable method. As will be described further in conjunction with FIGS. 1-5, the social networking system, in some embodiments, iteratively searches for and identifies connections to similar nodes using the social graph, allowing advertisers to leverage additional information from the social networking system to target ads.

Figure 1:
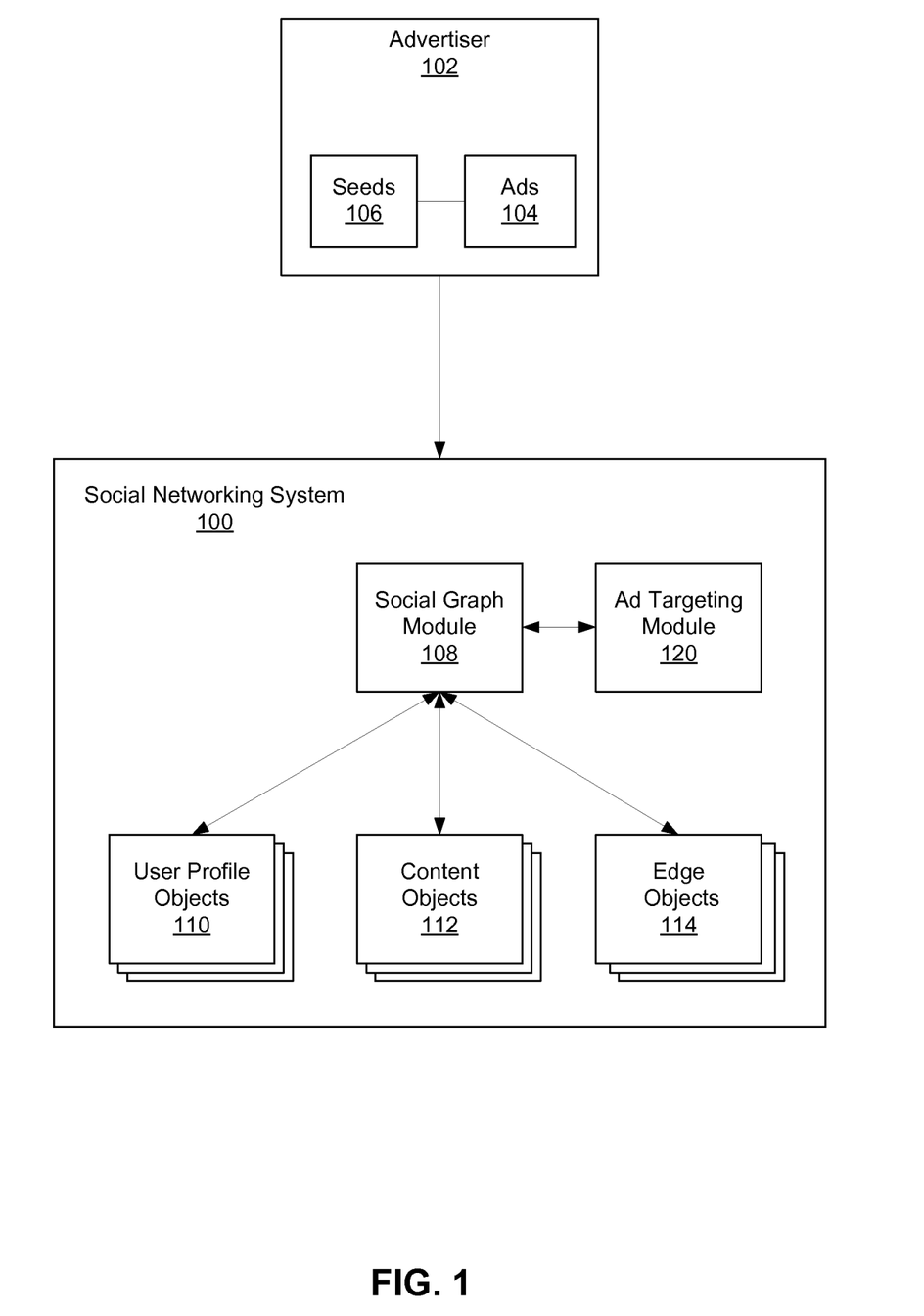
FIG. 1 illustrates a high level block diagram of a process of targeting ads to users of a social networking system by seeding the search for suggesting targeting criteria for the ad, in an embodiment.

FIG. 1 illustrates a high level block diagram of an embodiment of a process of targeting ads to users of a social networking system. In the example of FIG. 1, the process shows interactions between a social networking system 100 and an advertiser 102. The social networking system 100 exchanges data with the advertiser 102. The data includes one or more advertisements ("ads") and one or more seeds 106. The advertiser 102 associates one or more seeds 106 with an ad 104. For example, seeds 106 are keywords associated with the ad 104, the advertiser's name, a competitor's name, a product name or other information the advertiser 102 associates with the ad 104. As an additional example, seeds 106 include user information, such as a list of social networking users. An ad 104 generally includes data intended to cause the recipient of the ad 104 to take some action concerning a product or service. Examples of actions include purchasing, inquiring for additional information, becoming aware of a product or service or other suitable interaction by the recipient.

To target an ad 104 to one or more social networking system users, the advertiser 102 provides one or more seeds 106 to the social networking system 100, which identifies objects associated with one or more of the seeds 106. In one embodiment, the seeds 106 are included in an ad 104 transmitted to the social networking system 100. Alternatively, the seeds 106 are transmitted to the social networking system 100 separate from an ad 104. The seeds 106 generally include information associated with the ad 104 used by the social networking system 100 to identify objects in the social networking system 100 related to the ad 104. The seeds 106 may be as specific or as a broad as desired by the advertiser 102.

In various embodiments, the social networking system 100 includes different types of objects representing entities. In the example of FIG. 1, the social networking system 100 includes user profile objects 110, content objects 112, and edge objects 114. The user profile objects 110 include information describing a user of the social networking system 100. User information includes biographic, demographic, education history, employment history, or other data describing the user. The content objects 112 include any type of object on the social networking system 100, such as status updates, messages, photographs, images, audio data, video data, pages or other data, page posts, shared links, applications or check-in events at a merchant or venue. That is, the content objects 112 include any object acted upon by a user on the social networking system 100. Interactions between a user and the content objects 112 generate the edge objects 114. The edge objects 114 describe information about the interaction or relationship between objects, including identifying information about the user, the content object 112, and the type of action performed. For example, an edge object 114 describes a relationship between the user profile objects 110 or between a user profile object 110 and a content object 112.

The social networking system 100 also includes a social graph module 108, which generates a social graph using retrieved user profile objects 110, content objects 112 and edge objects 114. As described above, and further described in conjunction with FIG. 3, the social graph allows the social networking system 100 to more readily identify relationships or interactions between objects. In the social graph each object is represented by a node, and the each edge object is represented as a connection between the nodes corresponding to the interacting objects.

Objects associated with a seed 106 are also referred to herein as "seed objects," which may be pages, events, posts, comments, content, or groups related to the ad. For example, if a seed 106 of "coffee" is received, the social graph module 108 may identify seed objects that are pages associated with the seed 106 of "coffee," comments from users such as "I like coffee" or "Let's meet for coffee," events at a merchant location offering free samples of the new coffee blend, or a post in a user news feed indicating plans to try the new blend. Using the social graph and the seed objects, the social graph module 108 identifies one or more candidate objects, which are additional objects from the social graph identified using the seed objects. The candidate objects are provided from the social networking system 100 to the advertiser 102, allowing the advertiser 102 to select target objects from the candidate objects.

The advertiser 102 transmits the target objects to the ad targeting module 120 of the social networking system 100, as well as the ad 104, or an ad identifier, associated with the target objects. Based on the target objects, the ad targeting module 120 generates one or more targeting criteria used to identify social networking system users to whom the ad 104 is served. In an embodiment, targeting criteria includes a user interaction with one or more of the target objects. Examples of interactions with a target object include indicating a preference for a target object (i.e., "liking" a target object), purchasing a target object, commenting on a target object, listening to a target object, attending or planning to attend a target object, inviting to a target object, checking-in to a target object, viewing a target object, tagging a target object, playing an online game associated with a target object or any other suitable interaction with a target object.

System Architecture

Figure 2:
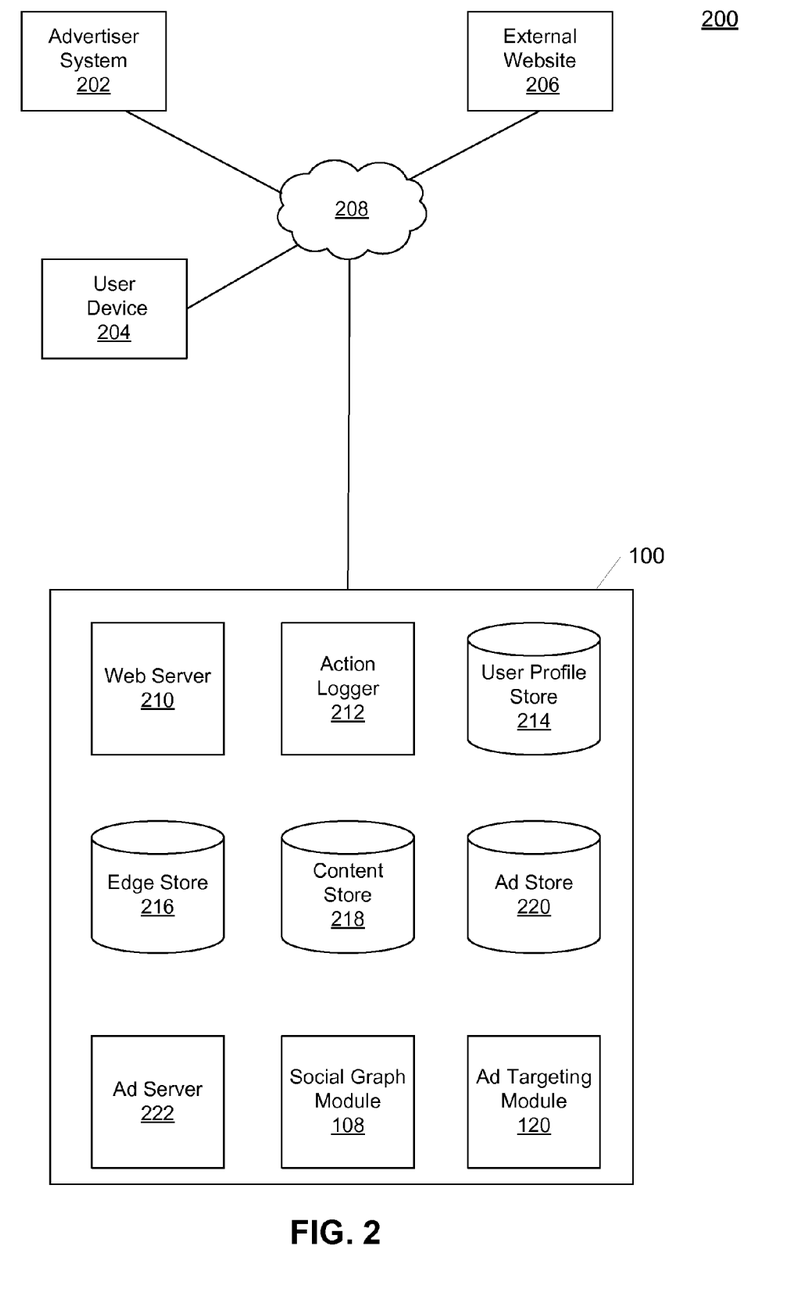
FIG. 2 illustrates a network diagram of a system for targeting ads to users of a social networking system by seeding the search for suggesting targeting criteria for the ad, in an embodiment.

FIG. 2 illustrates a network diagram of a system architecture 200 for targeting ads to users of a social networking system 100 by seeding the search for suggesting targeting criteria for the ad, in an embodiment. The system architecture 200 includes the social networking system 100, an advertiser 102, a user device 204, and an external website 206, coupled to communicate via a network 208. The example system may be organized in an alternative topology or configuration, and include different and/or additional modules sufficient to target ads to users of the social networking system 100 by seeding the search for suggesting targeting criteria for the ad.

The advertiser system 202 is associated with an advertiser 102 and comprises one or more computing devices to receive user input and to transmit and receive data via the network 208. In one embodiment, the advertiser system 202 is a conventional computer system executing, for example, a Microsoft WINDOWS®-compatible operating system (OS), Apple OS X®, and/or a Linux distribution. In one embodiment, the advertiser system 202 interfaces with the social networking system 100 through the network 208 and a web-based interface. The advertiser 102 uses the advertiser system 202 to provide content to users of the social networking system 100. For example, the advertiser 102 uses the advertiser system 202 creates and manages one or more pages in the social network system 102 to distribute content from the advertiser 102 to the social networking system users interested in the advertiser 102. In an embodiment, the advertiser 102 creates multiple pages hosted on the external website 206 and accessible via the social networking system 100. For example, a page may be created for various merchant locations or store fronts associated with the advertiser 102. For example, Starbucks may create and/or manage a page for each of the over 17,000 Starbucks retail stores worldwide. In another example, a brand-owner, such as Coca-Cola Company may create a page for products (e.g., COCA-COLA®, DIET COKE®, etc.) or product lines (e.g., soft drinks, energy drinks, and sports drinks).

Additionally, the advertiser 102 may provide ads to the social networking system 100 for presentation to social networking system users in addition to other content. In one embodiment, the advertiser 102 targets ads to groups of social networking users through seeds, which are used by the social networking system 100 to determine targeting criteria for the ads, as further described below. For example, the interface between the advertising system 202 and the social networking system 100 includes one or more dialog boxes, or other input mechanisms, for the advertiser 102 to identify one or more seeds. The advertising system 202 receives candidate objects based on the seeds from the social networking system 100 via the network 208, allowing the advertiser 102 to select target objects from the candidate objects. In one embodiment, the advertising system 202 provides an interface to the advertiser 102, allowing the advertiser to identify seeds, as well as identifying target objects from candidate objects, as further described below. For example, the interface displays a list of seed objects and candidate objects identified by the social networking system 100 and allows the advertiser 102 to select one or more target objects.

For example, the interface allows the advertiser 102 to select seeds and/or target objects using a selection box, dragging or otherwise moving an item from a list into another region of the interface, and clicking on an item in the list. In an embodiment, the interface also refreshes a list of candidate objects based on the target objects selected by the advertiser 102. To indicate a change to the target objects, the interface includes new objects in a different region of the interface, or otherwise displays the new items in a manner that visually distinguishes them from previously displayed items. Examples of visually distinguishing new items from previously displayed items include adding a visual indicator to new items, displaying the new item in a different color, font size, font type or other formatting characteristic.

The external website 206 includes a graph object for a social networking user to act upon using a user device 204. An interaction between the user and the graph object are communicated to the social networking system 100, using, for example, a social plug-in, widget, or code snippet. The social networking system 100 observes this interaction, and in turn, stores the graph object and the user as nodes on a social graph. The social networking system 100 also stores on the social graph the interaction between the graph object and the user as an edge between the nodes. For example, a user, using the user device 204, executes a "play" action of a song by Esperanza Spalding, "Little Fly," by accessing the external website 206, which hosts a digital music service. The social networking system 100 captures the song as a graph object, and the interaction between the user and the graph object as an edge between a node associated with the user and another node associated with the song object. In this example, the social networking system 100 also captures edges between the user and sub-objects that describe the object. In the preceding song example, sub-objects of the song object may include artist—Esperanza Spalding, and album—Chamber Music Society.

In an embodiment, the user device 204 comprises a computing device with similar components and functionality as described in reference to the advertiser system 202. In another embodiment, the user device 204 is a mobile computing device, such as a mobile phone, smart-phone, tablet device, or other device suitable to interact with the social networking system 100 and/or the external website 206 via the network 208. Generally, the user device 204 executes one or more applications to receive an ad from the social networking system 100, or otherwise interact with the social networking system 100. In an embodiment, the user device 204 interacts with the social networking system 100 through an application programming interface (API) that runs on the native operating system of the user device 204, such as iOS® and ANDROID™.

The network 208 uses standard communications technologies and/or protocols to facilitate communication between the social networking system 100, the advertiser system 202, the user device 204, and the external website 206. For example, the network 208 includes wired and/or wireless links using technologies, such as Ethernet, 802.11 family of standards, worldwide interoperability for microwave access (WiMAX), $3^{rd}$ Generation Partnership Project (3GPP) family of standards, CDMA, digital subscriber line (DSL), etc. Similarly, the networking protocols supported on the network 208 include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). The data exchanged over the network 208 can be represented using technologies and/or formats including the hypertext markup language (HTML) and the extensible markup language (XML). In addition, all or some of links can be encrypted using conventional encryption technologies, such as secure sockets layer (SSL), transport layer security (TLS), and Internet Protocol Security (IPsec).

The social networking system 100 includes a web server 210, an action logger 212, a user profile store 214, an edge store 216, a content store 218, an ad store 220, an social graph module 108, an ad targeting module 120, and an ad server 222. In other embodiments, the social networking system 100 includes additional, fewer, or different modules for various applications. Conventional components such as network interfaces, security functions, load balancers, failover servers, management and network operations consoles, and the like are not shown so as to not obscure the details of the system.

The web server 210 links the social networking system 100 via the network 208 to one or more user devices 204, advertiser system 202, and external website 206. The web server 210 serves web pages, as well as other web-related content, such as JAVA®, FLASH®, XML, and so forth. The web server 210 provides the functionality to receive from the advertiser 102 seeds for use in suggesting targeting criteria for an ad, and to provide seed and target objects to the advertiser 102 for selecting and determining targeting criteria for the ad. The web server 210 also provides the functionality to search and route messages between the social networking system 100 and the user device 204. For example, to communicate with the user device 204 to serve and ad based on the determined targeting criteria, the web server 210 exchanges information over the network 208 using, instant messages, queued messages (e.g., email), text and SMS (short message service) messages, or messages sent using any other suitable messaging technique.

The action logger 212 receives communications from the web server 210 about user actions on and/or off the social networking system 100. In one embodiment, actions identified by the action logger 212 are stored in an action log, simplifying construction of a social graph including the identified actions. Examples of actions include actions with objects internal to the social networking system 100, such as, adding a connection to a user, sending a message to a user, uploading an image, reading a message from a user, viewing or listening to content associated with another user or social networking system object, attending an event posted by another user, among others. The action logger 212 may also log user actions external to the social networking system 100, such as interactions with the external website 206 indicating a preference for content on the website, viewing streaming media from a content streaming service provider, purchasing a song for download based on a recommendation of another social networking system user, or other suitable actions. The action logger 212 captures data about these user interactions to help social networking system users receive content relevant to the users based on information the user elects to share with the social networking system 100.

The social networking system 100 stores user account information and other related information for a user in the user profile store 214. The user profile information stored in the user profile store 214 describes users of the social networking system 100, including biographic, demographic, and other types of descriptive information. Examples of user profile information include work experience, educational history, gender, hobbies or preferences, location, and the like. A user profile may also store other information provided by the user, for example, images or videos. In certain embodiments, images of users may be tagged with data identifying the social networking system 100 displayed in an image, with the images identified by user profile information of the identified users. The user profile store 206 may also include references to actions in an action log performed by the user on objects and/or performed by objects on the user.

The edge store 216 stores the information describing connections between users and other objects on the social networking system 100. Some edges may be defined by users, allowing users to specify their relationships with other users. For example, users may generate edges with other users that parallel the users' real-life relationships, such as friends, coworkers, partners, and so forth. Other edges are generated when users interact with objects in the social networking system 100, such as expressing interest in a page on the social networking system 100, sharing a link with other users of the social networking system 100, and commenting on posts made by other users of the social networking system 100. The edge store 216 stores edge objects that include information about the edge, such as affinity scores for objects, interests, and other users. The social networking system 100 computes affinity scores over time to approximate a user's affinity for an object based on the actions performed by the user. For example, the social networking system 100 computes an affinity score to represent a user's interest in other users of the social networking system 100. Multiple interactions between a user and a specific object may be stored in one edge object in the edge store 214, in one embodiment. For example, a user that plays multiple songs from Tito Puente's album, "El Rey Bravo," may have multiple edge objects for the songs, but only one edge object for Tito Puente.

The social graph module 108, as previously described, organizes the social information (e.g., user profiles, content, edge objects) stored on the social networking system 100 into a social graph. As described above, the social graph comprises a plurality of nodes connected by one or more edges. The nodes represent various objects in the social networking system, and the edges connecting nodes identify a relationship or as association between objects corresponding to the connected nodes. Hence, the social graph describes the interaction and/or relationship between objects in the social networking system.

Additionally, the social graph module 108 allows advertisers to user the social graph to target ads to social networking system users or to groups of social networking system users. In one embodiment, the social graph module 108 receives one or more seeds from the advertising system 202. As described above, the seeds are associated with ads provided by the advertising system 202 and are used to determine targeting criteria for the ads. The social graph module 108 compares the seeds to nodes and edges in the social graph to identify objects in the social networking system 100 associated with the seeds, also referred to as "seed objects." In an embodiment, seeds include one or more keywords, and the social graph module 108 identifies objects associated with one or more of the keywords (e.g., objects including a keyword) as seed objects. For example, when receiving seed that is the keyword "coffee," the social graph module 108 may apply a semantic analysis operation or machine learning operation to identify objects related to the keyword "coffee," such as posts referring to coffee, events referring to coffee, pages in the social networking system 100 associated with coffee brands. The social graph module 108 may also identify user information associated with seed objects. For example, the social graph module 108 associates one or more user names with identified seed objects. Alternatively or additionally, seeds received from the advertiser system 202 are mapped by the social graph module 108 to seed objects in a similar manner. For example, the social graph module 108 maps an offer for a free coffee to seed objects related to coffee as previously described.

Using the seed objects, the social graph module 108 searches the social graph for additional objects related to the seed objects, referred to herein as "candidate objects," to suggest and/or determine targeting criteria. For example, to search for candidate objects from seed objects, the social graph module 108 computes the similarity between one or more seed objects and other objects in the social graph. Similarity may be determined in several ways. For example, similarity between a seed object and an object is computed by determining nodes in the social graph, which represent objects in the social networking system 100, connected to both a node representing the seed object and a node representing the object. In one embodiment, objects connected to one of the node representing the seed object and the node representing the object are also used to determine similarity between the seed object and the object. In another example, similarity may be computed for a node representing a seed object and a node representing an object by determining the number of nodes connected to the node representing the seed object and connected to the node representing the object, and normalizing the determined number of nodes by the neighbors of either of the node representing the seed object and the node representing the object according to the following equation:

$$S(x,y) = |N(x) \cap N(y)| / |N(x) \cup N(y)| \qquad \text{Equation (1)}$$

Where S(x,y) is the similarity between node x and node y. In one embodiment, node x is the node representing the seed object and node y is the node representing the object. In the preceding equation, N(x) represents the number of nodes pointing to node x and N(y) represents the number of nodes pointing to node y.

In some embodiments, the social graph module 108 may apply one or more techniques for filtering the objects of the social networking system 100 based on the seed and/or seed objects before computing similarity to reduce the amount of computation to identify seed objects. For example, one or more filtering techniques are applied when the social graph includes an increasingly large number of candidate objects from which candidate objects are identified. For example, to filter the number of objects, the social module 108 identifies one or more clusters of related objects by accessing one or more indexes describing information stored in the user profile store 214, the content store 218, and the edge store 216. In an embodiment, information in these stores may are indexed according one or more data dimensions, such as topically (e.g., "coffee"), demographically, connection type, etc.

The social graph module 108 selects one or more candidate objects based on the computed similarities and communicates the candidate objects to the advertising system 202. For example, the social graph module 108 identifies objects having a similarity to a seed object that equals or exceeds a threshold similarity as candidate objects. Communicating the candidate objects to the advertising system 202 aids an advertiser in determining targeting criteria for the ad. In one embodiment, the social graph module 108 may choose a set of candidate objects for communication to the advertising system 202 based on one or more factors, reducing the number of candidate objects communicated to the advertising system 202. Example factors for reducing the number of candidate objects include the extent of similarity between target objects, object type, or connection type.

Social graph module 108 receives target objects from the advertising system 202, which are selected from the candidate objects, and sends the target objects to the ad targeting module 120. The target objects are used by the ad targeting module 120 to specify targeting criteria for the ad. In another embodiment, the social graph module 108 selects another set of candidate objects based on the target objects selected by the advertiser 102, as described above with reference to selecting the candidate objects. Hence, the social graph module 108 may iteratively change candidate objects presented to the advertiser 102 based on which objects the advertiser 102 selects as target objects.

The ad targeting module 120 determines one or more targeting criteria for the ad using the target objects. In an embodiment, the ad targeting module 120 specifies targeting criteria as whether a user interacted with (e.g., liked, watched, listened, purchased, recommended, commented etc.) a target object. As another example, the ad targeting module 120 may select the number of times or frequency with which a user interacted with the object as targeting criteria. In another embodiment, the ad targeting module 120 applies targeting criteria received from the advertiser 102 or a third-party (e.g., a marketing analytics service) based on the target objects.

The ad server 222 serves ads, received from the advertising system 202 and stored as ad objects included in the ad store 220, to users of the social networking system 100. The ad server 222 serves the ad to users satisfying one or more of the targeting criteria associated with the ad and determined from the target objects. For example, the ad server 222 serves an ad to a user device 206 associated with a user associated with a node in the social graph having an edge to one or more of the target objects. In an embodiment, ads served by the ad server 222 include content items posted by users of the social networking system 100 that are sponsored by an advertiser. For example, a user may create a check-in event at a coffee shop in San Francisco, Calif. that is shared with other users connected to the user. An advertiser for the coffee shop may select that check-in event for distribution to other users by creating an ad based on the check-in event that is targeted to the other users connected to the user who checked-in.

Social Graph

Figure 3:
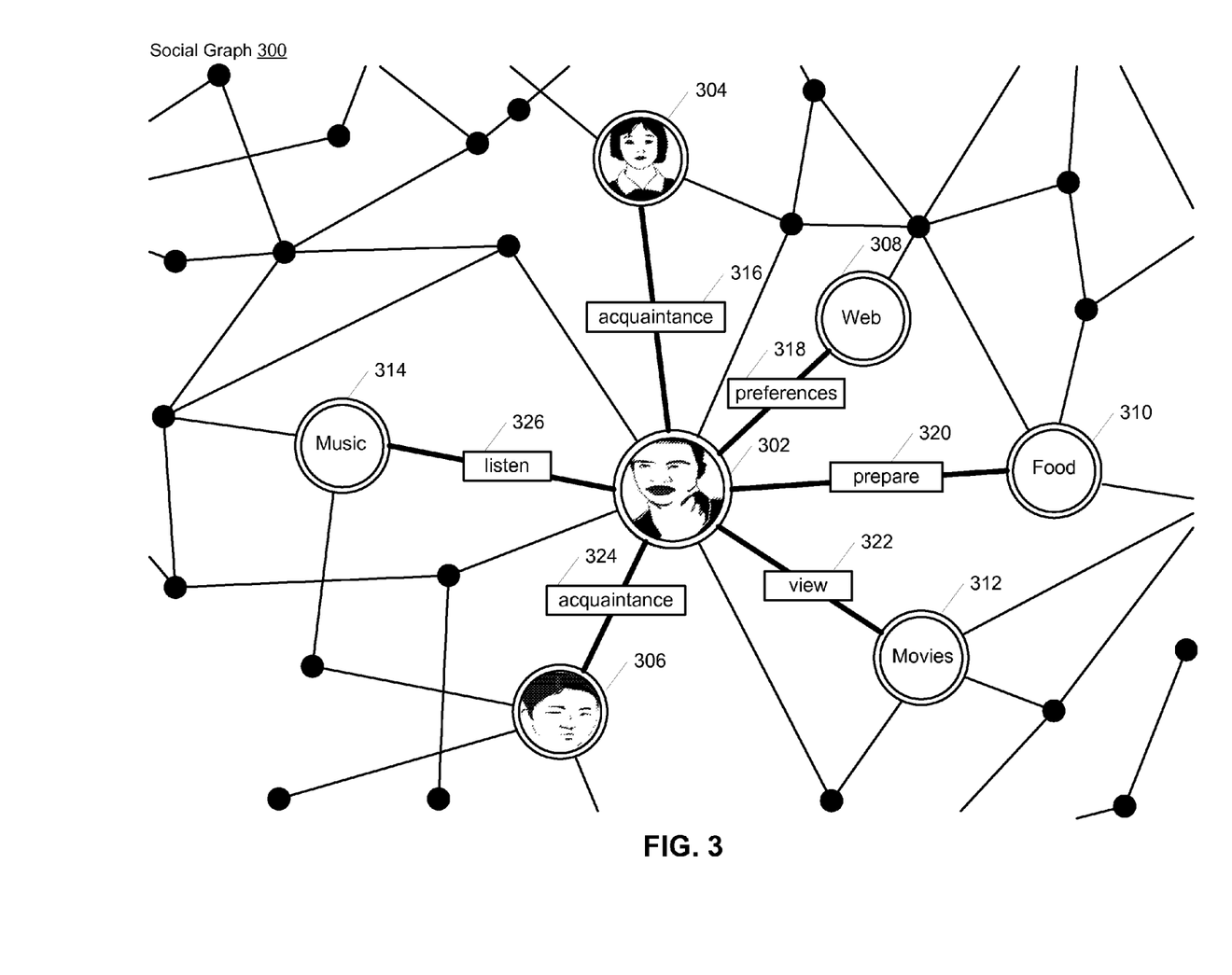
FIG. 3 illustrates an example of a social graph, in an embodiment.

FIG. 3 illustrates an example social graph, in accordance with an embodiment. The social graph 300 shown in FIG. 3 includes nodes 302, 304, 306, 308, 310, 312, and 314, representing a variety of social networking system objects that can act on and/or be acted upon by another node. In FIG. 3, nodes 302, 304, and 306 represent user objects. Node 308 represents a page object associated with an external website. Node 310 represents a recipe object from a cooking application. Node 312 represents a video object (e.g., a movie) from a video streaming application, and node 314 represents a song object from a music streaming application.

An edge between nodes in the social graph 300 represents a particular kind of connection between the nodes. For example, an acquaintance 316 connection type connects nodes 302 and 304 and nodes 302 and 306. In another example, a preference 318 connection type connects node 302 with node 308. Connections may result from an action performed by one of the nodes on another node. For example, the user object represented by node 302 performs the action "prepare" 320 for the recipe associated with the object corresponding to node 310. Similarly, the user object represented by node 302 performs the action of "listen" 326 for the song associated with the object corresponding to node 314, and "view" 322 for the movie associated with object corresponding to node 312. Other actions may include listing social networking system objects in a user profile, subscribing to or joining a social networking system group or fan page, sending a message to another social networking system user, making a purchase associated with a social networking system node, commenting on a content item, or RSVP'ing to an event. Hence, the social graph 300 allows a social networking system 100 to represent objects in the social networking system 100 as well as relationships or associations between the objects.

Targeting Criteria Determination

Figure 4:
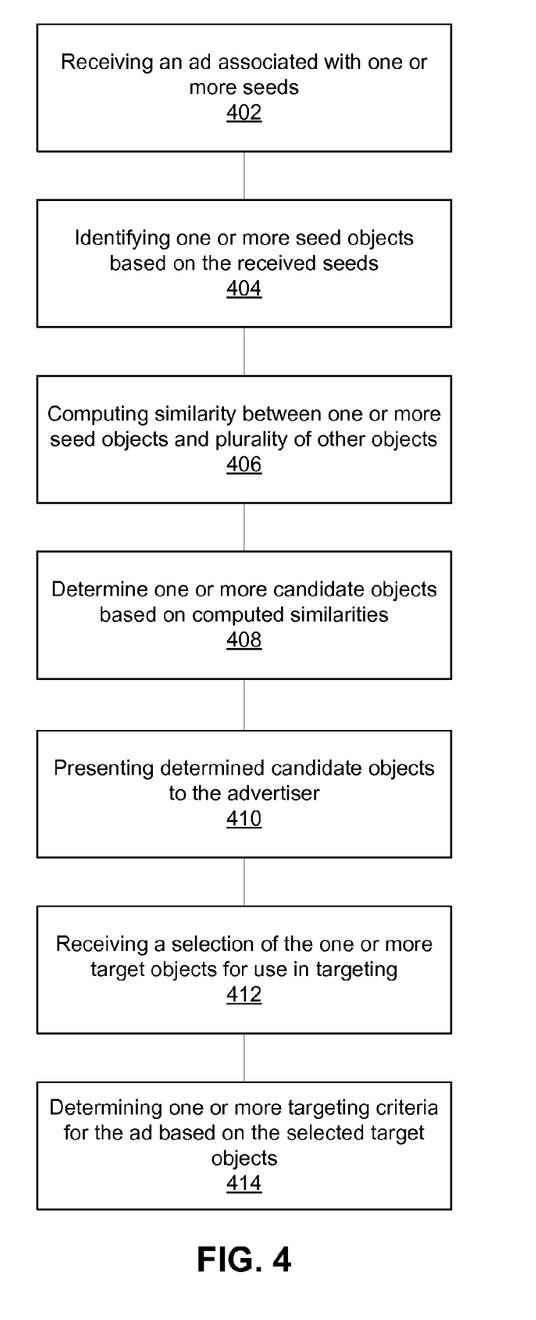
FIG. 4 illustrates a flowchart of a process of targeting ads to users of a social networking system by seeding the search for suggesting targeting criteria for the ad, in an embodiment.

FIG. 4 illustrates a flowchart of one embodiment of a process 400 for targeting ads to users of a social networking system. The social networking system 100 receives 402 an ad associated with one or more seeds. For example, the social networking system 100 receives the ad as an ad object, including content as well as one or more seeds. In another example, an ad and one or more the seeds are received separately, along with an association between the ad and the one or more seeds.

The social networking system 100 identifies 404 one or more seed objects based on the received seeds. In one embodiment, the social networking system 100 identifies objects associated with one or more of the seeds. For example, the seeds comprise one or more keywords and the social networking system 100 identifies 404 objects associated with a keyword as seed objects. In an embodiment, the social networking system 100 maps keywords to seed objects by performing a semantic analysis operation or machine learning operation.

Based on the seed objects, the social networking system 100 identifies candidate objects using a social graph. In one embodiment, the social networking system 100 identifies candidate objects based on the similarity between seed objects and other objects. The social networking system 100 computes 406 a similarity between one or more of the seed objects and a plurality of other objects associated with nodes in the social graph. Similar nodes include, among other things, nodes with similar neighbors (i.e., common links), and nodes within a specified proximity (e.g., within a co-linking distance of three degrees of separation) on the social graph. Similarity may be determined in several ways. For example, similarity between a seed object and an object is computed by determining nodes in the social graph, which represent objects in the social networking system 100, connected to both a node representing the seed object and a node representing the object. Further examples of similarity calculation are described above in conjunction with FIG. 2.

In an embodiment, the social networking system 100 filters the nodes in the social graph using one or more criteria to reduce the amount of nodes to which objects associated with seed nodes are compared. For example, the social networking system 100 filters the number of objects by grouping or clustering like objects, and selecting one or more objects from these groups or clusters based on ranking or weighting assigned to the objects within the group or cluster to simplify selection of candidate objects. In an embodiment, the social networking system 100 identifies one or more clusters of related objects by accessing one or more indices describing information stored in the social networking system 100. For example, the social networking system 100 may cluster objects related to coffee into pages, posts, and actions (e.g., check-in at Starbucks) using information stored in the user profile store 214, the edge store 216, and the content store 218.

The social networking system 100 then determines 408 one or more candidate objects for display to the advertisers 102 based on the computed similarities. In an embodiment, the social networking system 100 determines 408 a set of the target objects for display with the highest computed similarity. In another embodiment, the social networking system 100 determines 408 a set of the target objects for display with the highest computed similarity for a range of object types. Alternatively, the social networking system determines 408 objects having a similarity to a seed object equaling or exceeding a threshold similarity as candidate objects. For example, for an ad promoting a new song, the social networking system 100 determines 408 five objects with the highest computed similarity from each of content objects (e.g., songs by the same artist), user objects (e.g., users that indicated an interest for the song, album, or artist), application objects (e.g., streaming music services providing the song for listening), and page objects related to the song (e.g., fan page on the artist's website, page for a club featuring the artist at an upcoming concert, and a page for a coffee shop offering the artist's album for sale) as candidate objects.

In another embodiment, the social networking system 100 determines 408 candidate objects based on a preference received from the advertiser 102. For example, the advertiser 102 specifies the number, type, and threshold computed similarity of candidate objects. In another embodiment, the social networking system 100 determines 408 candidate objects in a random manner, or in a manner to best fit the display constraints of the advertiser system 202. The candidate ads are then presented 410 from the social networking system 100 to the advertiser 102.

From the candidate ads, the advertiser 102 selects one or more target objects. In an embodiment, the advertiser 102 iteratively selects objects by selecting target objects and receiving additional candidate objects from the social networking system 100 based on the selected target objects.

Each iteration of target object selection and presentation of additional candidate objects allows the advertiser 102 to refine targeting criteria used for one or more ads. This allows the advertiser 102 to identify ads more likely to be engaged by connections in the social networking system 100.

The social networking system 100 receives 412 an indication of a completed selection of target objects from the advertiser 102, and determines 414 one or more targeting criteria for the ad based on the target objects. For example, targeting criteria may include whether a user interacted with (e.g., liked, watched, listened, purchased, recommended, etc.) the object, the number of times a user interacted with the object or any other suitable interaction between a user and a target object.

Using the targeting criteria determined from one or more target objects, the social networking system 100 to identify users to whom an ad associated with the targeting criteria is served from the social graph. For example, the social networking system 100 identifies user objects corresponding to nodes on the social graph that have an edge to at least one of the node corresponding to a target object as users to whom the ad may be served. In one embodiment, the social networking system 100 ranks user objects based on number of edges to target objects, based on number of target objects to which users have an edge or any other suitable criteria to further refine users who are served the ad. For example, edges between user objects and target objects are used to form a targeting cluster of users who are served an ad.

SUMMARY

The foregoing description of the embodiments has been presented for the purpose of illustration; it is not intended to be exhaustive or to limit the embodiment to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also relate to an apparatus for performing the operations herein. This apparatus may be particularly constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
receiving from an advertiser via an interface of a social networking system one or more seeds for suggesting targeting criteria for an advertisement;
identifying one or more seed objects in a social graph maintained by the social networking system based on the received seeds, the social graph stored in a database and including nodes corresponding to objects and connections representing relationships established in the social networking system between connected objects;
querying the database to identify a plurality of other objects based on connections in the social graph between the seed object and the identified other objects;
computing, using a processor of the social networking system, a similarity between one or more of the seed objects and each of the plurality of other objects associated with nodes in the social graph, the similarity between a seed object and the other object determined based at least in part on a comparison of nodes in the social graph having connections to both the node associated with the other object and to the node associated with the seed object and nodes in the social graph not having connections to both the node associated with the other object and to the node associated with the seed object;
determining one or more candidate objects selected from the plurality of other objects based on the computed similarities;
presenting the determined candidate objects to the advertiser;
receiving from the advertiser a selection of one or more target objects from the candidate objects for use in the targeting criteria for the advertisement; and
determining, using the processor of the social networking system, one or more targeting criteria for the advertisement based on the selected target objects, users of the social networking system having a connection to at least one of the selected target objects identified as eligible to receive the advertisement.

2. The method of claim 1, wherein the one or more seeds comprise one or more keywords associated with the advertisement.

3. The method of claim 1, wherein the one or more seeds comprise one or more objects maintained by the social networking system and associated with the advertisement.

4. The method of claim 3, wherein objects comprise at least one of pages, groups, events, posts, comments, and content.

5. The method of claim 1, wherein the one or more seeds comprises a list of users.

6. The method of claim 1, wherein identifying the seed objects comprises receiving the seed objects from the advertiser.

7. The method of claim 1, wherein the similarity between the seed object and each of the plurality of other objects is normalized based on the number of connections for the node associated with the other object and for the node associated with the seed object.

8. The method of claim 1, wherein computing the similarity between one or more of the seed objects and each of the plurality of other objects associated with nodes in the social graph is calculated by:

$$S(x,y)=|N(x) \cap N(y)|/|N(x) \cup N(y)|,$$

where x denotes the node associated with the other object, y denotes the node associated with the seed object, $S(x,y)$ denotes the similarity between the node associated with the other object and the node associated with the seed object, $N(x)$ represents a number of nodes connected to the node associated with the other object and $N(y)$ represents a number of nodes connected to the node associated with the seed object.

9. The method of claim 1, wherein receiving the selection of one or more target objects from the candidate objects for use in the targeting criteria for the advertisement comprises:
responsive to receiving the selected one or more target objects, computing the similarity between the selected target objects and one or more objects associated with nodes in the social graph, the similarity between a selected target object and the object based at least in part on a comparison of nodes in the social graph having connections to both a node associated with the selected target object and to the node associated with the object;
selecting a second set of target objects from the objects associated with nodes in the social graph based on the computed similarities; and
providing the selected second set of target objects to the advertiser.

10. The method of claim 9, further comprising:
receiving a selection of one or more of the second set of target objects for use in the targeting criteria for the advertisement; and
determining one or more additional targeting criteria for the advertisement based on the selected second set of target objects.

11. The method of claim 1, wherein the candidate objects include one or more of the seed objects.

12. The method of claim 1, further comprising:
accessing user profiles maintained by the social network;
determining from the user profiles and the social graph, whether a node in the social graph associated with a user has at least one connection to a target object; and
responsive to the node in the social graph associated with the user having at least one connection to a target object, serving the advertisement to the user.

13. The method of claim 1, wherein the targeting criteria is whether a node in the social graph associated with a user has a connection to a node of at least one target object, the connection indicating the user interacted with the at least one target object.

14. The method of claim 13, wherein user interactions with the at least one target object comprise at least one of: liking a target object, viewing a target object, listening to a target object, commenting on a target object and purchasing a target object.

15. A method comprising:
  receiving, at a social networking system, one or more seeds associated with an advertisement from an advertiser system;
  identifying one or more seed objects associated with one or more of the seeds, the seed objects corresponding to one or more nodes in a social graph stored in a database and comprising that comprises nodes corresponding to objects and a plurality of connections representing relationships established in the social networking system between connected objects;
  querying the database to identify a plurality of additional objects based on connections in the social graph between the seed object and the identified additional objects;
  computing, using a processor of the social networking system, a similarity between one or more of the seed objects and each of the identified additional objects associated with nodes in the social graph, the similarity between a seed object and the additional object based at least in part on a comparison of nodes in the social graph having connections to both the node associated with the additional object and to the node associated with the seed object and nodes in the social graph not having connections to both the node associated with the additional object and to the node associated with the seed object;
  selecting one or more candidate objects from the plurality of additional objects based on the computed similarities;
  receiving, from the advertiser system, a selection of one or more target objects from the candidate objects to use for targeting criteria for the advertisement;
  responsive to receiving a selected target object, computing similarities between the selected target object and each of the plurality of the additional objects, a similarity between the selected target object and the additional objects based at least in part on connections involving the target object and the additional objects;
  selecting, using the processor of the social networking system, one or more additional target objects from the plurality of additional objects based on the computed similarities between the selected target object and each of the plurality of the additional objects;
  providing the one or more additional target objects from the social networking system to the advertiser system; and
  receiving, from the advertiser system, a confirmation to use the selected target objects for targeting criteria for the advertisement, users of the social networking system having a connection to at least one of the selected target objects identified as eligible to receive the advertisement.

16. The method of claim 15, wherein the one or more seeds comprise one or more keywords associated with the advertisement.

17. The method of claim 15, wherein the one or more seeds comprise one or more objects maintained by the social networking system and associated with the advertisement.

18. The method of claim 17, wherein objects comprise at least one of pages, groups, events, posts and comments.

19. The method of claim 15, wherein the one or more seeds comprises a list of users.

20. The method of claim 15, wherein identifying the seed objects comprises receiving the seed objects from the advertiser system.

21. The method of claim 15, wherein the similarity between the seed object and each of the plurality of additional objects is normalized based on the number of connections for the node associated with the additional object and for the node associated with the seed object.

22. The method of claim 15, wherein computing the similarity between one or more of the seed objects and each of the plurality of additional objects associated with nodes in the social graph is calculated by:

$$S(x,y)=|N(x) \cap N(y)|/|N(x) \cup N(y)|,$$

where x denotes the node associated with the object, y denotes the node associated with the seed object, $S(x,y)$ is the similarity between the node associated with the object and the node associated with the seed object, $N(x)$ represents a number of nodes connected to the node associated with the object and $N(y)$ represents a number of nodes connected to the node associated with the seed object.

23. The method of claim 15, further comprising:
  accessing user profiles maintained by the social network;
  determining whether a node in the social graph associated with a user has at least one connection to a target object from the user profile and the social graph; and
  responsive to the node in the social graph associated with the user having at least one connection to a target object, serving the advertisement to the user.

24. The method of claim 15, further comprising: selecting the advertisement for serving to a user of the social networking system based on whether the user has interacted with at least one of the target objects.

25. The method of claim 15, further comprising generating one or more target objects by filtering the one or more candidate objects.

26. The method of claim 25, wherein filtering comprises:
  identifying one or more clusters of related objects from the one or more candidate objects; and
  selecting, from the one or more clusters of related objects, one or more target objects based on one or more seed objects.

* * * * *

UNITED STATES PATENT AND TRADEMARK OFFICE
CERTIFICATE OF CORRECTION

PATENT NO. : 9,020,835 B2  
APPLICATION NO. : 13/549061  
DATED : April 28, 2015  
INVENTOR(S) : Ding Zhou Page 1 of 1

It is certified that error appears in the above-identified patent and that said Letters Patent is hereby corrected as shown below:

In the Claims:
Column 17, line 11, delete "that comprises".

Signed and Sealed this
Twenty-sixth Day of July, 2016

Michelle K. Lee
*Director of the United States Patent and Trademark Office*